United States Patent [19]

Beery

[11] 4,355,816
[45] Oct. 26, 1982

[54] DOUBLE ACTING INTERNAL DIAMETER GRIPPING CHUCKS

[75] Inventor: Jay D. Beery, Traverse City, Mich.
[73] Assignee: Sheffer Collet Company, Traverse City, Mich.
[21] Appl. No.: 164,784
[22] Filed: Jun. 30, 1980
[51] Int. Cl.³ .......................... B23B 5/22; B23B 5/34
[52] U.S. Cl. .................................. 279/2 R; 279/109; 279/119
[58] Field of Search ............... 279/118, 2 R, 119, 1 J, 279/106, 109

[56] References Cited
U.S. PATENT DOCUMENTS

| | | | |
|---|---|---|---|
| 1,455,351 | 5/1923 | Olson | 279/119 |
| 1,839,401 | 1/1932 | Lewis | 279/2 R |
| 2,361,763 | 10/1944 | Goddard | 279/106 |
| 2,613,943 | 10/1952 | Trudeau | 279/106 |
| 3,082,015 | 3/1963 | Howwart | 279/1 J |
| 3,099,457 | 7/1963 | Howwart et al. | 279/106 |
| 4,236,722 | 12/1980 | Felker | 279/118 |

Primary Examiner—R. L. Spruill
Assistant Examiner—Paul M. Heyrana, Sr.
Attorney, Agent, or Firm—Price, Heneveld, Huizenga & Cooper

[57] ABSTRACT

A chuck is disclosed for gripping an annular workpiece by jaws clamping against the inside wall of the workpiece. The jaws extend axially of the chuck and are rocked between clamping and release positions by levers which contact the radially outer face of the rearward end of the jaws as a result of pivoting about a point adjacent the radial outer periphery of the chuck body. The levers are moved by an axially movable actuator at the axial center of the chuck. The arrangement provides a mechanical advantage such that the chuck in closed position is substantially self locking.

1 Claim, 3 Drawing Figures

DOUBLE ACTING INTERNAL DIAMETER GRIPPING CHUCKS

BACKGROUND OF THE INVENTION

This invention relates to chucks for machine tools and particularly to chucks of the type having work clamping jaws secured to the chuck body in such a manner that they can be pivoted to shift the jaws between clamping and release positions. It is important in this type of chuck that the forces exerted upon the clamping jaws by their engagement with the workpiece have little or no effective leverage to inadvertently cause release of the jaws from the clamped position. It is also important that the chuck be capable of exerting adequate clamping force on the workpiece because failure to do so can result in improperly machined pieces or in inadvertent release of the workpiece, this latter being a serious potential hazard to employees. Co-pending U.S. patent application Ser. No. 39,389, filed May 16, 1979, entitled "Double Acting Cam Operated Chuck Collet", having an assignee common with that of this application, discloses such a chuck designed to clamp the workpiece by engaging its outer edge. This invention provides such a chuck which is capable of engaging the inside edge of the workpiece.

BRIEF SUMMARY OF THE INVENTION

This invention provides a chuck having a plurality of workpiece clamping jaws arranged in a circle. The jaws are elongated fore and aft of the chuck. Intermediate their ends they are pivotally mounted to the chuck body for rocking motion whereby their forward ends can be shifted radially between workpiece clamping and workpiece release positions. The chuck is equipped with a lever for each of the jaws. These levers are pivotally mounted about an end radially outwardly from the inner end of the jaws whereby movement of the inner end of the levers axially of the chuck results in pivotal movement of the jaws. A wedging or camming action connection is provided between the jaws and the levers with the result a substantial mechanical advantage is gained in applying clamping pressure to the jaws. This is done in such a manner that the forces generated by the pressure of the jaws against the workpiece are substantially or totally ineffective to cause release of the workpiece.

DESCRIPTION OF THE PREFERRED EMBODIMENT

Figure 1:
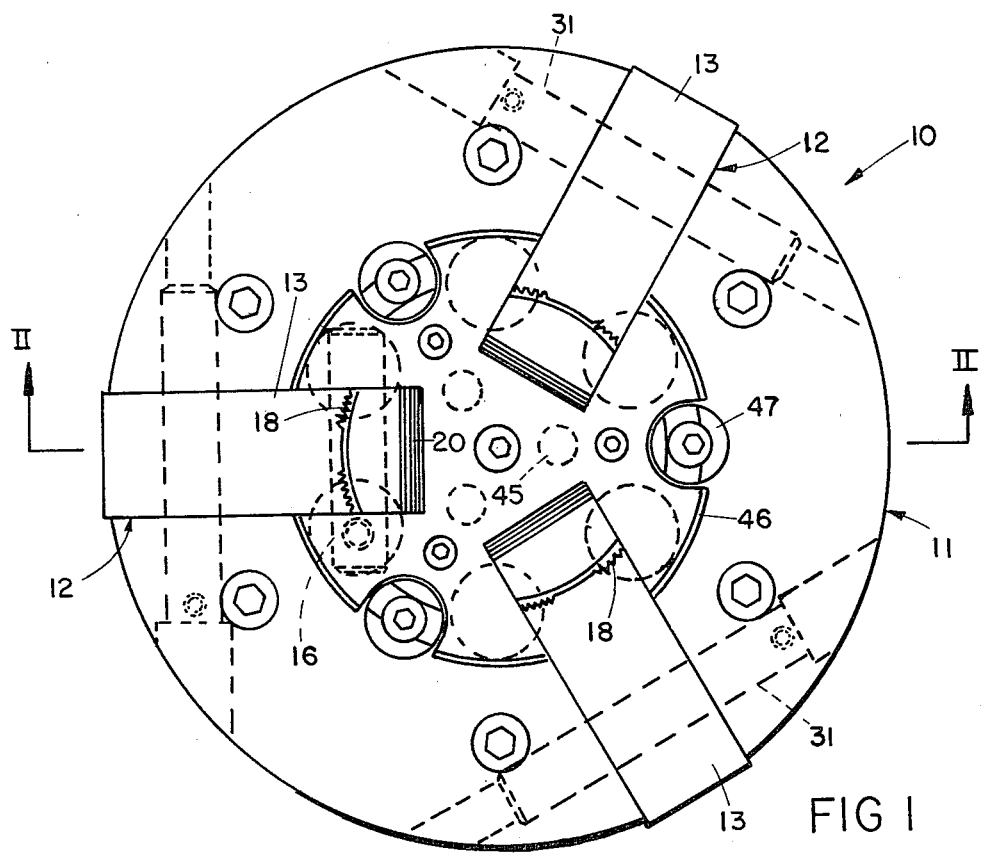
FIG. 1 is a view of the front of a chuck embodying this invention.
Figure 2:
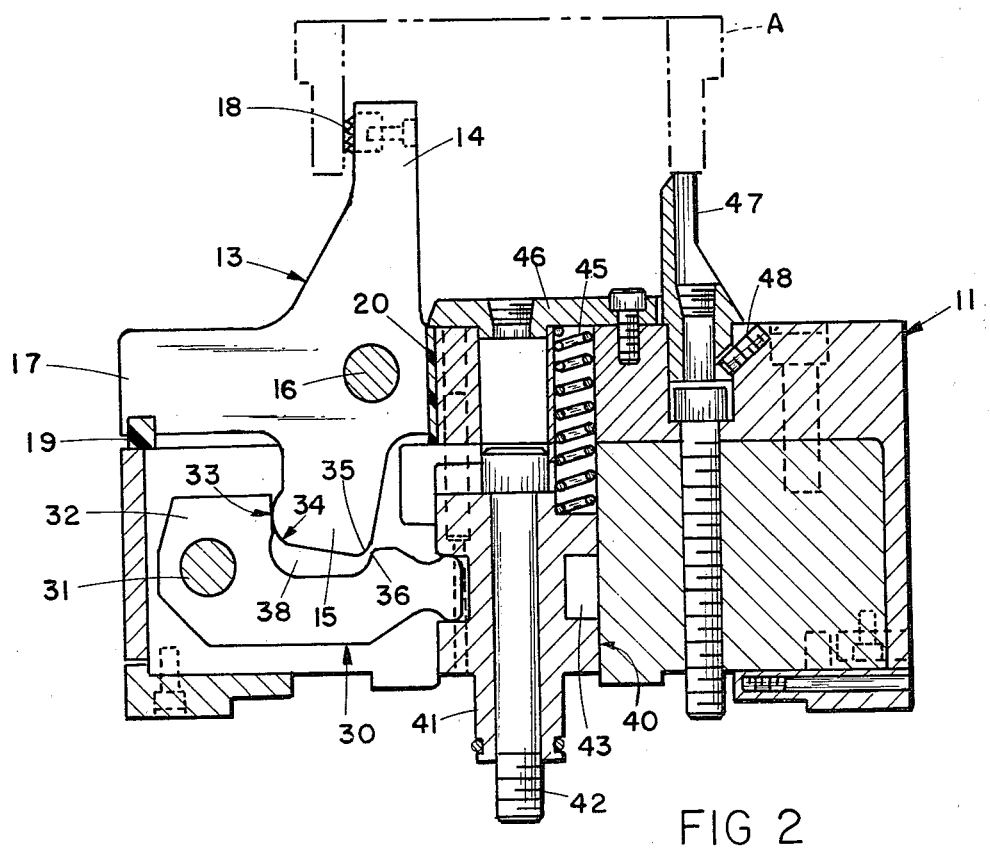
FIG. 2 is a sectional view of the chuck illustrated in FIG. 1 taken along the plane II—II of FIG. 1 illustrating the chuck in workpiece clamping position.

Referring to FIG. 1, the numeral 10 indicates a chuck having a main body portion 11, the front face of which has three radially extending slots 12. Seated in each of the slots 12 is a jaw 13. As best seen in FIG. 2, the jaws 13 are elongated axially of the chuck having a forwardly projecting leg 14 and a rearwardly projecting leg 15. Intermediate the fore and aft ends of the jaws 13, they are pivotally secured to the main body by a suitable pivot or hinge pin 16. The jaws also have a radially, outwardly extending leg 17 which is basically centered about the pivot pin 16. The forward end of each of the legs 14 is equipped on its radial outer face with a replaceable workpiece clamping plate 18. These face plates are made readily replaceable to compensate for wear or to substitute plates of a different thickness to accommodate workpieces having a larger or smaller inner diameter. At their outer radial ends, the legs 17 have a compressible seal 19 recessed into the rearward face. This provides a dirt excluding seal for the slot since the seal 19 bears against the main body 11 immediately to the rear of it. Another resilient seal 20 is provided at the radially inner face of each of the jaws.

Behind the rearward end of the jaws the chuck is provided with a plurality of levers 30, one for each of the jaws. The levers extend radially and, adjacent the outer periphery of the chuck body, each of the levers is pivotally mounted by a suitable pin 31. The inner ends of the levers 30 extend radially inwardly beyond the inner faces of the jaws. Each of the levers has a recess 38 opening through its forward face which receives the rearward end of the adjacent jaw 13. Each lever also has a forwardly extending arm 32 at its outer end immediately adjacent the pivot pin 31. This arm has an inner radial face 33 positioned adjacent but radially inward of the pin 31. This inner radial face 33 is flat and provides a surface for engaging the cam 34 at the rearward end of the adjacent jaw 13. The cam 34 is convex, thereby providing a surface which can travel smoothly across the flat surface 33 on the inner face of the leg 32.

The inner radial rearward corner of the rear portion 15 of each of the jaws is radiused at 35 and designed to seat against the radiused inner end wall 36 of the recess 38. By this arrangement, when the lever 30 is rocked rearwardly, engagement between the surface 33 of the lever and the cam 34 on the jaw results in the jaw being pivoted into workpiece clamping position. When the lever 30 is rocked in the opposite direction, the end wall 36 contacts the radiused inner corner 35 positively shifting the jaw to workpiece release position.

Centered about the central axis of the chuck is a circular passage 40 opening through the rear of the chuck body. Slidably seated in the passage 40 is a spool 41 having a rearwardly extending cap screw 42 at its center. The rearward end of the cap screw 42 is threaded so that it can be tied to a suitable actuating mechanism such as a tie rod or an actuating cylinder operated either hydraulically or pneumatically. The use of such a spool, cap bolt and actuating mechanism is conventional. Between its ends, the spool is provided with a circumferential channel 43. The ends of the levers 30 are seated in this channel and are shaped so that they may rotate with respect to the spool as it shifts axially of the chuck to rock the levers. The forward end of the spool 41 mounts a plurality of compression springs 45, the forward ends of which are seated against the cap member 46 which closes the forward end of the center of the chuck body 11. The springs bias the spool rearwardly.

Extending forwardly from the face of the main body 11 are three workpiece locators or stops 47. These can be axially adjusted and, when adjusted, locked in position by the lock screws 48. The stops 47 are conventional and function as locators for the workpiece shown in phantom in FIG. 2 and indicated by the letter A.

FIG. 2 illustrates the chuck of this invention in workpiece clamping position. In this position the spool 41 is withdrawn rearwardly. This rocks the levers clockwise as illustrated in FIG. 2. This, in turn, results in counterclockwise pivoting of the jaw into clamping position against the inside face of the workpiece A. Because the pivot 31 about which the lever 30 pivots is located rearwardly of and radially outward of the point of engagement between the lever and the cam 34, the forces generated by reason of the clamping action against the inside face of the workpiece A create only a very small force couple about the pivot 31. Especially is this true inasmuch as the point of contact where these forces are transmitted to the lever 30 is only a short distance forward of the pin 31. This keeps the magnitude of the force couple to a minimum. Further, since the pin 31 is spaced a substantial distance radially from the point of engagement between the lever 30 and the spool 41, the ability of the spool to resist the force generated by the jaw, is multiplied to the extent that it is virtually impossible for the jaw to effect any axial movement of the spool and thus any release effect of the jaw. Simply the normal frictional resistance to movement is enough to counteract the forces generated by the jaw. However, further resistance to release of the workpiece results from the springs 45 which bias the spool rearwardly and cooperate with the friction and inertia of the spool 41, the bolt 42 and any rod or operating mechanism to which the bolt is attached. By virtue of the mechanical advantage created by the design of the levers 30 and jaws 13, only a minimum force is necessary to open and close the jaws.

Figure 3:
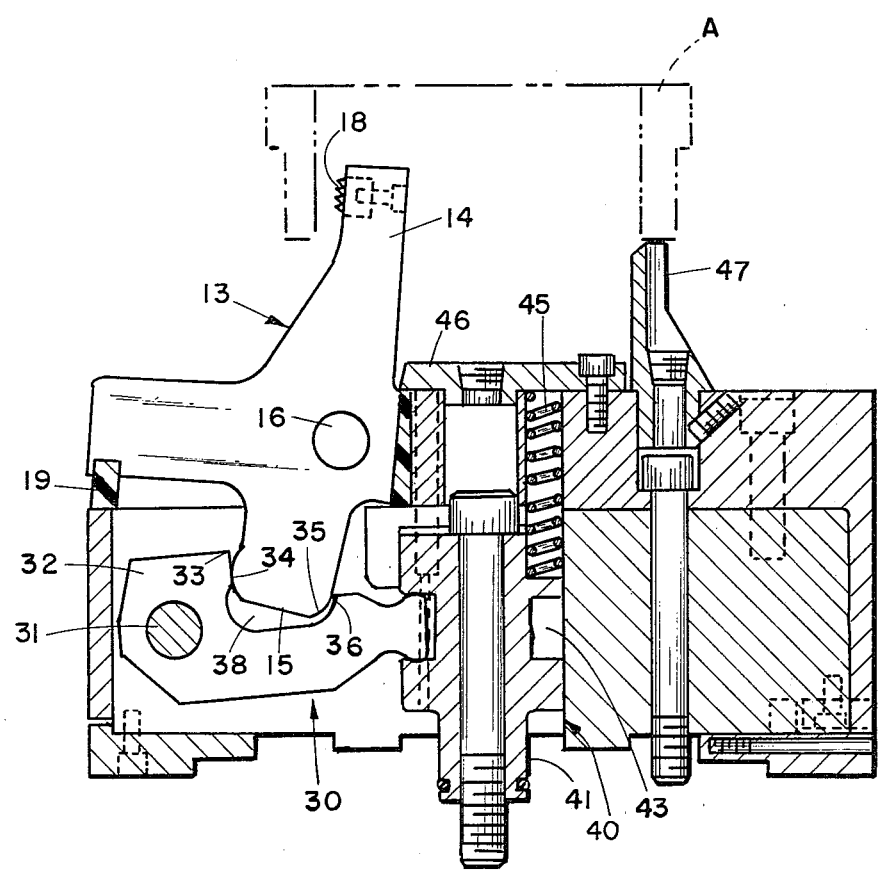
FIG. 3 is a view similar to FIG. 2 except that it shows the chuck in workpiece released position.

When the workpiece A is to be released, the spool 41 is shifted forwardly. As this occurs, the flat surfaces 33 shift outwardly away from the cams 34 permitting outward movement of the rear portions 15 of the jaws. When the forces acting on the jaws by reason of the clamping action are neutralized, the inner walls 36 of the recesses 38 take over to positively shift the jaws into product release position. This positive workpiece release is illustrated in FIG. 3. Thus, it will be understood that the invention provides both positive clamping and positive release. This is important in facilitating the mounting and removal of the workpieces.

Having described my invention, it will be recognized that various modifications of the invention can be made without departing from the principles incorporated therein. Such modifications are to be considered as included within the hereinafter appended claims unless these claims by their language expressly state otherwise.

The embodiments of the invention in which an exclusive property or privilege is claimed are defined as follows:

1. A chuck for internally gripping an annular workpiece, said chuck having a main body and a plurality of article gripping jaws arranged in a circle concentric with the axial center of said chuck; each of said jaws being elongated axially of the chuck and having a rearwardly extending arm; first means pivotally mounting each of said jaws intermediate its ends to said body; a plurality of generally radially extending levers, one for each jaw; each of said levers having a recess opening through its forward face; the rearward ends of said arms of said jaws being received in said recesses; each of said levers at its radial outer end having a forwardly extending leg forming the radial outer ends of the recesses and engaging the radial outer faces of the rearward ends of said arms; second means pivotally mounting each of said levers at a point axially rearwardly and radially outwardly of said arms; actuator means slidably and concentrically seated in said body and engaging the radial inner ends of said levers, said actuator means being movable axially of said body for pivoting said levers and said jaws between workpiece gripping and release positions; the inner radial end of each of said recesses being formed by a forwardly extending wall, the radial spacing from said second pivot means of the forward ends of said walls being such that said forward ends are spaced from the rearward ends of said arms when said jaws are in workpiece gripping position and the arcs of movement of said forward ends intersect the radially inner faces of the rearward ends of said arms after initial pivotal movement of said levers toward workpiece release position has occurred for positively shifting said jaws to release position.

* * * * *